(12) United States Patent
Brück et al.

(10) Patent No.: US 6,439,358 B1
(45) Date of Patent: Aug. 27, 2002

(54) SUPPORT ASSEMBLY HAVING A DEFORMATION ELEMENT WITH RADIAL DEFORMATION LIMITERS

(75) Inventors: Rolf Brück, Bergisch Gladbach; Carsten Kruse, Lohmar; Raimund Strigl, Reichertshofen, all of (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 0 days.

(21) Appl. No.: 09/707,556

(22) Filed: Nov. 7, 2000

Related U.S. Application Data

(63) Continuation of application No. PCT/EP99/02946, filed on Apr. 30, 1999.

(30) Foreign Application Priority Data

May 7, 1998 (DE) .......................... 198 20 463

(51) Int. Cl.[7] .................................................. F16F 7/12
(52) U.S. Cl. ...................................... 188/377; 292/133
(58) Field of Search ................................ 293/102, 103, 293/132, 133; 188/371–377; 267/139

(56) References Cited

U.S. PATENT DOCUMENTS

| | | | | |
|---|---|---|---|---|
| 2,947,459 A | * | 8/1960 | Pregent ....................... | 206/521 |
| 3,130,819 A | * | 4/1964 | Marshall ..................... | 188/377 |
| 3,252,548 A | * | 5/1966 | Pajak et al. ................. | 188/377 |
| 3,265,163 A | * | 8/1966 | Gilbert et al. .............. | 188/377 |
| 3,666,055 A | * | 5/1972 | Walker et al. .............. | 188/376 |
| 3,847,426 A | * | 11/1974 | McGettigen ................ | 188/376 |
| 3,851,911 A | * | 12/1974 | Brooks ........................ | 188/377 |
| 3,903,997 A | * | 9/1975 | Brooks ........................ | 293/133 |
| 3,905,454 A | * | 9/1975 | Brooks ........................ | 188/377 |
| 4,829,979 A | | 5/1989 | Moir | |
| 5,052,732 A | * | 10/1991 | Oplet et al. ................. | 293/103 |
| 5,542,365 A | * | 8/1996 | Jurisisch et al. ............ | 188/377 |

FOREIGN PATENT DOCUMENTS

| | | | |
|---|---|---|---|
| DE | 3809490 C1 | * | 5/1989 |
| DE | 38 09 490 C1 | | 5/1989 |
| DE | 89 00 467.1 U1 | | 6/1990 |
| DE | 8900467.4 U1 | * | 6/1990 |
| DE | 40 24 942 A1 | | 2/1992 |
| DE | 4024942 A1 | * | 2/1992 |
| DE | 4445557 A1 | * | 6/1996 |
| DE | 44 45 557 A1 | | 6/1996 |
| DE | 19650647 A1 | * | 4/1997 |
| DE | 196 50 647 A1 | | 4/1997 |
| EP | 0 389 750 B1 | | 10/1990 |
| EP | 0 389 751 A1 | | 10/1990 |
| FR | 2.211.901 | | 7/1974 |
| FR | 2 761 434 | | 10/1998 |
| GB | 1 489 065 | | 10/1977 |
| GB | 2 029 720 A | | 3/1980 |
| GB | 2305487 A | * | 4/1997 |
| GB | 2 305 487 A | | 4/1997 |
| GB | WO-98/06553 | * | 2/1998 |
| JP | 54 003 667 | | 1/1979 |
| JP | 07 145 842 | | 6/1995 |
| WO | WO 98/06553 | | 2/1998 |

\* cited by examiner

*Primary Examiner*—Pam Rodriguez
*Assistant Examiner*—Robert A. Siconolfi
(74) *Attorney, Agent, or Firm*—Laurence A. Greenberg; Werner H. Stemer; Gregory L. Mayback

(57) ABSTRACT

A support assembly includes a deformation element for use in a motor vehicle for absorbing kinetic energy in case of an impact. The deformation element can be deformed to a residual block length. The deformation element is connected to a supporting structure and includes a honeycomb matrix body. The honeycomb matrix body of the deformation element is self-supporting and has at least one radial deformation limiter whose axial stiffness is lower than that of the matrix body. This allows using the deformation element without a supporting jacket, so that the properties of the deformation element can be determined independently of those of a jacket.

49 Claims, 9 Drawing Sheets

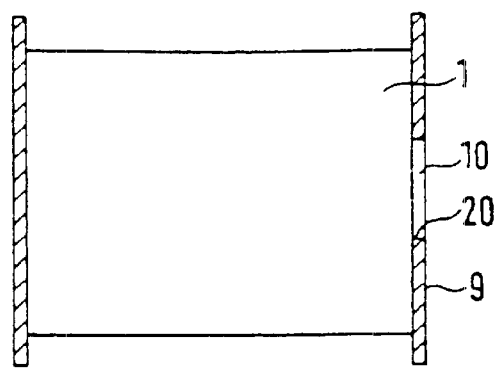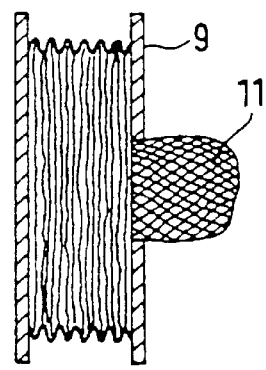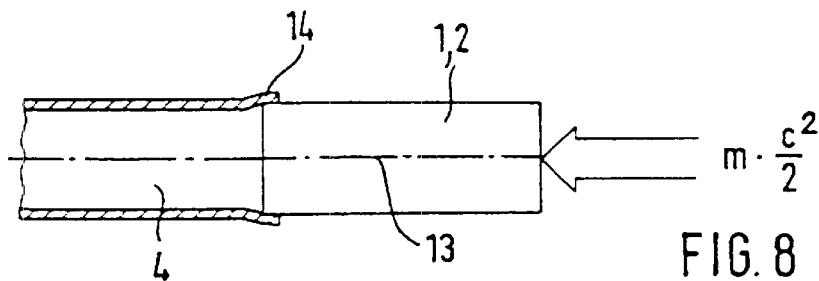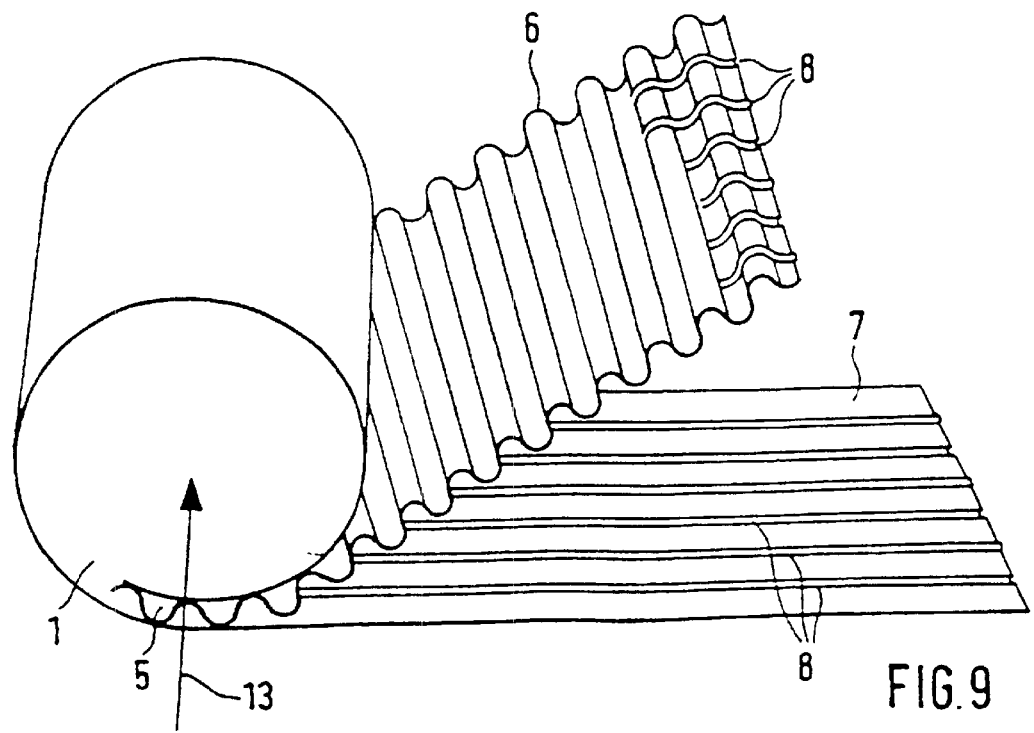

SUPPORT ASSEMBLY HAVING A DEFORMATION ELEMENT WITH RADIAL DEFORMATION LIMITERS

CROSS-REFERENCE TO RELATED APPLICATION

This application is a continuation of copending International Application No. PCT/EP99/02946, filed Apr. 30, 1999, which designated the United States.

BACKGROUND OF THE INVENTION

Field of the Invention

The invention relates to a support assembly with a deformation element, in particular for a motor vehicle, for absorbing kinetic energy during an impact.

Deformation elements for absorbing kinetic energy are used in an extremely wide range of engineering applications. One particular area of application for elements of this kind is in motor vehicles. The technical and safety standards require that, in the case of minor impacts, the impact energy should be absorbed in an essentially elastic manner by corresponding elements and, in the case of more severe impacts, e.g. in the case of accidents, the kinetic energy should be absorbed by such elements and converted into deformation of the latter. Thus, for example, the prior art includes deformation elements which are used for longitudinal members of a vehicle and which remain undamaged in the event of an impact up to 4 km/h and, in the case of an impact up to 15 km/h, absorb the entire kinetic energy and convert it into deformation. In general, such deformation elements are integrated into the longitudinal members to form a unitary supporting structure, with the result that the entire longitudinal member has to be replaced in the event of damage. The requirement that essentially the entire kinetic energy should be absorbed by the deformation elements without a significant proportion of this deformation energy being transmitted to the other structures of a motor vehicle is one that must also be satisfied with a view to increasing the survival chances of people in vehicles that are involved in an accident.

Honeycomb structures are used in many different ways for various applications in engineering. For example, honeycomb structures are used in the construction of aircraft, where requirements for lightweight construction and high strength, in particular, are important. Honeycomb structures are also known from areas where it is not so much the strength of such a honeycomb structure as increasing the surface area which is important, e.g. in the case of catalyst substrates in the exhaust system of a motor vehicle for removing the noxious exhaust components that remain in the exhaust after combustion in the engine.

German Utility Model G 89 00 467 U1, European Patent Application 0 389 750 A1, UK Patent Application GB 2 029 720 A, German Published, Non-Prosecuted Patent Application DE 40 24 942 A1, German Patent DE 38 09 490 C1 and German Published, Non-Prosecuted Patent Application DE 44 45 557 A1, corresponding to U.S. application Ser. No. 08/879,594, filed Jun. 20, 1997, have disclosed various configurations and structures for honeycomb bodies. In general, these honeycomb bodies that have been described are used to improve the flow characteristics in the matrix body's channels, which are configured as flow channels, in order to obtain improved chemical reactions. The jacketing configurations surrounding the actual matrix body are used to absorb the high thermal loads to which catalyst substrates of this kind are exposed in the exhaust system of a motor vehicle.

German Published, Non-Prosecuted Patent Application DE 196 50 647 A1 has disclosed a deformation element for a motor vehicle, in which a honeycomb body that is known per se and disposed in a jacketing tube is used as a deformation element.

One disadvantage with the known deformation elements is that they are either integrated completely into the supporting structures, necessitating replacement of the entire supporting structure in the event of damage, or, where deformation elements with a honeycomb structure are used, a steep rise in the curve describing the deformation force/deformation path profile (F,s profile) occurs relatively quickly if high kinetic energy is introduced, which means that the high deformation forces that occur are transmitted directly into the supporting structure. Another disadvantage is that the known deformation elements with a honeycomb structure have a jacketing configuration which may also affect the deformation behavior to a considerable extent, possibly in a disadvantageous way.

SUMMARY OF THE INVENTION

It is accordingly an object of the invention to provide a support assembly having a deformation element which overcomes the above-mentioned disadvantages of the heretofore-known support assemblies of this general type and which, compared with conventional support assemblies having deformation elements, ensures a desired deformation force/deformation path profile (F,s profile), which in particular meets respective application-specific requirements, and which minimizes the effect of a jacketing configuration on the deformation behavior and which can be used, in particular, for vehicle bumper systems.

With the foregoing and other objects in view there is provided, in accordance with the invention, a support assembly for a motor vehicle, including:

a supporting structure;

a deformation element for absorbing kinetic energy during an impact, the deformation element being connected to the supporting structure and being deformable as far as a residual length, and the deformation element including a honeycomb matrix body;

the honeycomb matrix body being a self-supporting configuration and having at least two axial partial regions spaced from one another;

the honeycomb matrix body including at least one radial deformation limiter disposed in the at least two axial partial regions of the matrix body; and the honeycomb matrix body having a first axial rigidity and the at least one radial deformation limiter having a second axial rigidity smaller than the first axial rigidity.

In other words, the support assembly according to the invention has a deformation element, in particular for motor vehicles, for absorbing kinetic energy during an impact. When the kinetic energy is introduced, the deformation element can be deformed as far as a residual block length and is connected to the supporting structure. The deformation element includes a honeycomb matrix body. According to the invention, the deformation element is a self-supporting configuration, i.e. the matrix body has adequate rigidity. Moreover, the matrix body of the deformation element is surrounded by at least one radial deformation limiter with a low axial rigidity.

The task of a radial deformation limiter of this kind is to prevent a situation where, as kinetic energy is introduced into the deformation element, the matrix body of the latter is severely deformed in the radial direction or in a direction that differs from the longitudinal axis of the matrix body assigned to the deformation element when the latter is deformed. Sideways displacement of parts of the matrix body during its longitudinal deformation, away from the longitudinal axis of the deformation element, results in non-compliance with the desired deformation properties for which the deformation element was configured since, in such a case, there is no guarantee that the deformation element will be able to absorb the kinetic energy. Radial deformation limiters are therefore provided around the outside of the matrix body and these ensure that the matrix body is deformed and crushed essentially only within its original volume when forces act on it in an axial or even somewhat lateral direction. However, the radial deformation limiters are dimensioned in such a way that in other respects they have as little effect as possible on the deformation behavior of the deformation element and therefore its $F,s$ profile.

The deformation behavior of the deformation element should be determined essentially by the matrix body alone. A jacketing configuration constructed from a relatively strong material completely surrounding the outside of the matrix body in the form of a sleeve or jacket has a relatively great effect on the deformation behavior. The less effect the radial deformation limiters have on the deformation behavior of the deformation element, the more effectively can the specific construction of the matrix body, including its dimensioning, be used to ensure an application-specific $F,s$ profile.

In accordance with another feature of the invention, the at least one radial deformation limiter is a jacket, which at least partially surrounds the honeycomb matrix body.

In accordance with yet another feature of the invention, the second axial rigidity and the first axial rigidity have a ratio of between 1:5 and 1:50 and preferably of less than 1:10.

According to a first exemplary embodiment, the radial deformation limiter is preferably configured as a jacketing configuration with a low axial rigidity which surrounds the matrix body and is preferably in the form of spaced jacketing rings. In this configuration, the purpose of the jacketing rings is to act as radial deformation limiters without representing a disturbing variable for the deformation behavior during the compression of the matrix body of the deformation element.

According to another exemplary embodiment, the radial deformation limiter is configured as a bellows-type corrugated hose with predetermined buckling points. In this configuration, the inside diameter of the corrugated hose is dimensioned in such a way that the troughs of its corrugations essentially touch the circumferential surface of the matrix body. A bellows-type corrugated hose of this kind can be deformed easily, especially in the axial direction, with the result that, when the matrix body is deformed essentially in its longitudinal direction to absorb kinetic energy, the corrugated hose does not make any significant contribution to the absorption of the kinetic energy. The presence of predetermined buckling points in the bellows-type corrugated hose ensures that, as the matrix body is compressed in its longitudinal direction, the individual corrugations of the corrugated hose are, as it were, folded up against one another.

The residual block length of the jacketing configuration which is theoretically obtained when the deformation element is deformed completely is preferably less than or at most equal to the residual block length of the matrix body. This ensures that the radial deformation limiters have no significant effect on the deformation behavior and hence on the $F,s$ profile in the case of complete deformation.

According to another exemplary embodiment, the corrugations of the corrugated hose of the jacketing configuration are configured in such a way that they act as initiators for buckles and/or folds in the radial deformation limiter at the beginning of the deformation process. These initiators ensure that, at the beginning of the deformation process in particular, the initial peak present in the $F,s$ profile is not increased by the radial deformation limiters. On the contrary, the matrix body is configured in such a way that the initial peak in the $F,s$ profile in particular is at least moderate or is preferably completely eliminated.

According to another exemplary embodiment of the invention, at at least one end at which there is a support or support region on the supporting structure, the deformation element is provided with a perforated plate with at least one hole. The at least one hole in the perforated plate is dimensioned in such a way that parts of the matrix body situated in the area of the hole can be displaced into the hole or through the hole in the direction of the deformation if a high kinetic energy is introduced. The displacement of parts of the matrix body which are situated in the area of the hole through the hole or into the hole in the direction of the main deformation occurs before the residual block length is reached, the shearing off of individual layers of sheet metal in the region of the edge of the holes and the compression of the layers of sheet metal occurring essentially simultaneously, with the result that parts of the matrix body enter or pass through the hole. When the residual block length is reached, the deformation element still has a certain residual porosity. The radial deformation limiters around the matrix body are configured in such a way that they have an at most insignificant effect on the $F,s$ profile.

One of the significant advantages of this configuration according to the invention is that, compared with the maximum deformation travel or deformation path in the presence of an end plate without a hole, i.e. not a perforated plate, the resulting residual block length with a perforated plate is reduced and, as a result, the maximum deformation travel is increased since the at least one hole in the perforated plate is dimensioned in such a way that, under the action of compressive and shearing forces, parts of the matrix body which are provided in the area of the hole are also pushed into the hole or even out of the hole when kinetic energy is introduced into the deformation element. As a result, the steep rise in force when the residual block length is reached is delayed, i.e. shifted to the right in the $F,s$ profile, compared with a deformation element with a closed cover plate provided at its end or where the end of the deformation element rests fully against the support of the supporting structure.

The perforated plate preferably has a plurality of holes, which can be distributed uniformly or nonuniformly in the surface of the perforated plate. In this configuration, the size of the holes is preferably such that those parts of the matrix body which are provided in the area of the holes can essentially push into or through all the holes under the action of the compressive and shearing forces when kinetic energy is introduced.

The edge of the respective hole is preferably configured in such a way that it extends over as many layers of sheet metal as possible. This is necessary to ensure that the layers of sheet metal of the matrix body which are situated in the area of the edge of the hole are sheared off as a result of shearing forces instead of individual parts of the matrix body being displaced through the hole without shearing taking place. The holes are preferably provided in the outer area of the perforated plate. This likewise contributes to preventing the radial deformation limiters from having an effect on the $F_s$ profile of the matrix body during deformation or of minimizing it. Because parts of the matrix body can be displaced through the holes in the perforated plate in the direction of the deformation, in particular in the outer area, the cavity thus created can be compressed by the lateral force that may be imposed by the deformation limiters during their deformation. This also contributes to a shortening of the residual block length.

According to another preferred exemplary embodiment, about 20 to 80%, preferably 40 to 60%, of the total area of the perforated plate is formed by holes. This ensures sufficient space through which or into which sheared-off parts of the matrix body can pass through the perforated plate when a high kinetic energy is introduced. The edges of the holes are preferably configured in such a way that they extend over at least five or at least ten layers of sheet metal. If a single hole is provided and the diameter of the matrix body is 90 mm, for example, the diameter of the hole can be about 55 mm. However, the corresponding holes in the perforated plate can differ from this as regards their configuration and size, depending on the application and the desired $F_s$ profile.

According to another configuration, the perforated plate is preferably integrated with its edge into the support of the supporting structure, thus ensuring that adequate supporting forces are available and, on the other hand, that a high deformation energy can be introduced.

The deformation element is supported or held in the supporting structure at one or both ends, preferably in such a way that the kinetic energy to be absorbed can be introduced essentially in the longitudinal direction of the deformation element. By virtue of the construction of the honeycomb matrix body with a plurality of channels, the formation of a perforated plate with holes of defined dimensions, the thicknesses and types of material etc., there is great configuration flexibility with regard to achieving a specific dimensioning of the deformation element according to the invention for particular applications. It is thus possible to achieve a desired $F_s$ profile.

If the deformation element is of tubular configuration, it is also referred to as a deformation tube (DEFO tube). In principle, the deformation element is constructed in such a way, by appropriate shaping and selection of the abovementioned parameters, that a maximum deformation travel is achieved for the given dimensions of the component.

Another advantage of a deformation element according to the invention of this kind is that ease of fitting and removal can be achieved through the use of a special configuration of the deformation element including its radial deformation limiters. The configuration of the respective honeycomb structure of the matrix body furthermore serves to enable load-bearing properties to be achieved, which must be ensured if the deformation element according to the invention is to be integrated or embedded into frame or supporting structures, making it possible to transmit loads at which the deformation element is capable of absorbing even the kinetic energy that occurs during impact loading. Corrosion-resistant material may be used for the deformation element according to the invention if the respective application demands it. However, it is also possible to sacrifice corrosion-resistant materials for reasons of cost and to provide the materials used for the element according to the invention with an anti-corrosion coating known per se. The strength can furthermore be influenced through the use of the respective thickness of the radial deformation limiters and the material chosen for these.

Using the configuration of the matrix body, it is also possible to influence the deformation behavior in a specifically targeted manner through the use of layers of sheet metal with transverse structures, for example. A maximum deformation travel can be achieved if the individual layers of sheet metal have holes, slots or longitudinal structures. The strength and weight of the deformation element according to the invention can furthermore be influenced in a specifically targeted manner through the use of its cell density, sheet thickness and method of winding of the matrix body. This can also be achieved, for example, through the use of oblique corrugations by using a cross-wound configuration. It is furthermore also possible to construct the matrix body in such a way that radial rigidity is reduced at the edge.

According to another exemplary embodiment, the jacketing configuration has a bead or a plurality of beads provided essentially transversely to the channels of the matrix. These beads have the advantage that, if the kinetic energy is introduced essentially in the longitudinal direction of the deformation element, the beads on the one hand have a certain initial elasticity and on the other hand represent points at which the jacket initially absorbs kinetic energy, with the sides of each bead being folded up against one another in the presence of corresponding deformation forces before the essentially smooth areas of the jacket between the beads are subjected to direct further deformation. These beads thus represent predetermined deformation points, the radial deformation limiters permitting deformation essentially only in the direction of the longitudinal axis of the deformation element.

Depending on the application and the level of kinetic energy to be absorbed, the radial deformation limiters have a wall thickness of 0.3 mm to 2.0 mm, preferably 0.5 to 2.0 mm when aluminum is used and 0.3 to 1.5 mm when steel, in particular deep-drawing steel, is used. However, a lower figure for thickness is preferred. The corrugated layers of sheet metal of the matrix body preferably have a thickness of about 0.02 mm to 0.2 mm, preferably 0.05 to 0.2 mm in the case of layers of sheet metal made of aluminum and 0.02 to 0.1 or 0.15 mm in the case of steel sheets, in particular those made of deep-drawing steel. In particular, the corrugations are configured in such a way that the matrix body has a cell density of 7.75 to 93 cells/cm$^2$ corresponding to 50 to 600 caps (cells per square inch).

The matrix preferably includes, in a manner known per se, packed flat layers of sheet metal or an essentially cylindrically wound assembly formed by a spiral, an involute shape or S shape for instance. The individual layers of sheet metal resting upon one another in the assembly can but need not be brazed together in the areas of contact.

According to another embodiment, the cell density of the matrix body is varied from section to section in the longitudinal direction. This is achieved, for example, by inserting additional layers of sheet metal with shallower corrugations or more widely spaced corrugations than in the corresponding adjacent section between essentially smooth layers of sheet metal, the smooth layers of sheet metal of the section with the lowest cell density preferably being provided so as to be continuous in the longitudinal direction of the matrix. It is also possible to vary the cell density of the matrix in the radial direction by winding up a layer of sheet metal with a corrugation frequency that increases continuously in one direction to form an essentially cylindrical honeycomb structure, for example.

According to another embodiment, the layers of sheet metal of the matrix have bead-like structures essentially transversely to the direction of the channels, these structures also being referred to as transverse structures. These transverse structures serve to ensure that when a sufficiently high kinetic energy is introduced, deformation within the matrix body starts initially at the transverse structures in order in this way to ensure an as uniform as possible absorption of the kinetic energy by the matrix body. These transverse structures are preferably provided at a spacing of from 2 mm to 20 mm.

According to yet another exemplary embodiment, the layers of sheet metal of the matrix body by which the channels are formed have within the channels laterally offset channel sections, also referred to as longitudinal structures. These longitudinal structures thus do not provide continuous channels but discontinuous channels, with the result that the matrix body has within it a structure corresponding to a turbulence cell structure or plate-fin structure, as used inter alias for heat exchangers. These longitudinal structures have the advantage that the kinetic energy-absorbing properties of the deformation element according to the invention can additionally be influenced in a specifically targeted manner through the use of the length of the channel sections offset section by section. This provides a further parameter for influencing the F,s profile to suit the specific application.

Preferably, it is also possible to provide the corrugations of the layers of sheet metal in a curved or herringbone configuration or as a combination of the two. Through the use of such curved corrugations or herringbone-configuration corrugations on the layers of sheet metal, it is possible to achieve a specific distribution of the deformation-inducing forces introduced into the interior of the matrix body, thereby likewise enabling the F,s profile to be influenced in an application-specific manner.

According to another exemplary embodiment of the invention, the matrix body or its channels is (are) preferably filled with a foamed material, the foamed material preferably being a foamed plastic, in particular a corrosion-inhibiting foamed plastic. On the one hand, this prevents corrosion from occurring within the matrix and the radial deformation limiters if stainless steel is not used, for example, such corrosion potentially having a disadvantageous effect on the deformation properties. On the other hand, it is also possible, by the selection of an appropriate foamed plastic with defined properties, to influence the absorption capacity for kinetic energy in the element in a specifically targeted manner, with the result that it is also possible to influence the F,s profile by introducing a foamed material.

The F,s profile of the deformation element can preferably be made essentially constant, at least in one section, preferably in a large section and, even more preferably, in its entirety through the use of a suitable multiplicity of predetermined deformation points in the deformation element. If, for example, a multiplicity of predetermined deformation points with different kinetic energy-absorbing properties is provided in the deformation element, it is also possible to provide at least one section in the F,s profile which rises progressively.

With regard to a maximum deformation path or deformation travel to be achieved relative to a defined overall length, the deformation element is configured in such a way as regards its deformation behavior that the maximum deformation travel is from about 60 to 200 mm. Depending on the application, the deformation travel can also be less than or greater than the range stated.

According to another exemplary embodiment of the invention, the matrix body has cavities formed by walls, the walls being part of the respective layers of sheet metal from which the matrix body is constructed. The deformation element is preferably secured on the supporting structure in such a way that forces developed during an impact can be introduced into the walls at an angle to a main direction of extension of the latter.

The cavities are preferably also configured as channels which, for example, extend coaxially to the longitudinal axis of the matrix body. When a deformation element with a matrix body of this kind is secured on the supporting structure in such a way that the forces introduced during an impact act essentially in the direction of the walls, the deformation energy is absorbed inter alias by the fact that the walls are subject to a buckling load. This results in a relatively sharp rise in the F,s profile immediately after the introduction of the kinetic energy. This steep initial rise or initial peak in the F,s profile has the effect that relatively high deformation forces are introduced into the supporting structure via the deformation element before the latter is deformed and thereby absorbs kinetic energy. As a result, the supporting structure may undergo plastic deformation due to the peaks in the deformation force. However, this is to be avoided.

In accordance with another feature of the invention, the deformation element has a longitudinal axis. The honeycomb matrix body includes at least one at least partially structured sheet metal layer. The at least one at least partially structured sheet metal layer forms a structure with walls having a main direction of extension extending at an angle with respect to the longitudinal axis. The structure with walls is a looped structure, a wound structure or a stacked structure.

In accordance with another feature of the invention, the support assembly with its deformation element is used in a bumper system of a motor vehicle.

According to the invention, the deformation element is configured or provided relative to the supporting structure in such a way that the forces developed during an impact are introduced at an angle to the main direction of extension of the walls, the direction being defined in relation to the longitudinal axis. By introducing the forces obliquely in this way, it is ensured that the walls can be deformed more easily, in particular at the onset of deformation, into the cavities, with the result that the initial peak in the F,s profile is at least greatly reduced. Through the use of a deformation element of this kind according to the invention, the initial region of the F,s profile too can thus be influenced in a specifically targeted manner to give an improvement in the absorption of kinetic energy introduced.

The main direction of extension of the layers of sheet metal forming the walls is preferably provided at an angle to the longitudinal axis. This can be achieved, for example, by winding the individual structured layers of sheet metal obliquely. If the main direction of extension of the walls forms an angle with the longitudinal axis, the deformation element can be secured on the supporting structure in such a way that the longitudinal axis is provided essentially perpendicular to the support or support region on the supporting structure.

However, it is also possible to use a conventional matrix body, the main direction of extension of the walls of which is essentially coaxial with the longitudinal axis of the matrix body, the matrix body being secured on the supporting structure in such a way that the longitudinal axis is provided at an angle to the support on the supporting structure.

In accordance with another feature of the invention, the deformation element has a front side. The supporting structure has a support region provided at the front side. The honeycomb matrix body has a longitudinal axis extending at an angle other than 90° with respect to the support region.

In accordance with another feature of the invention, the honeycomb matrix body is a conical matrix body or a frustoconical matrix body.

Other features which are considered as characteristic for the invention are set forth in the appended claims.

Although the invention is illustrated and described herein as embodied in a support assembly with a deformation element with radial deformation limiters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a diagrammatic sectional view of a deformation element in accordance with the invention with a simplified illustration of the matrix body;

FIG. 7 is a diagrammatic sectional view of the deformation element of FIG. 6 in the deformed state;

FIG. 8 is a diagrammatic, partial sectional view of a fundamental configuration of a deformation element according to the invention held at one end by the supporting structure;

FIG. 9 is a diagrammatic perspective view of an unfinished honeycomb matrix body during its production process;

DESCRIPTION OF THE PREFERRED EMBODIMENTS

Figure 1:
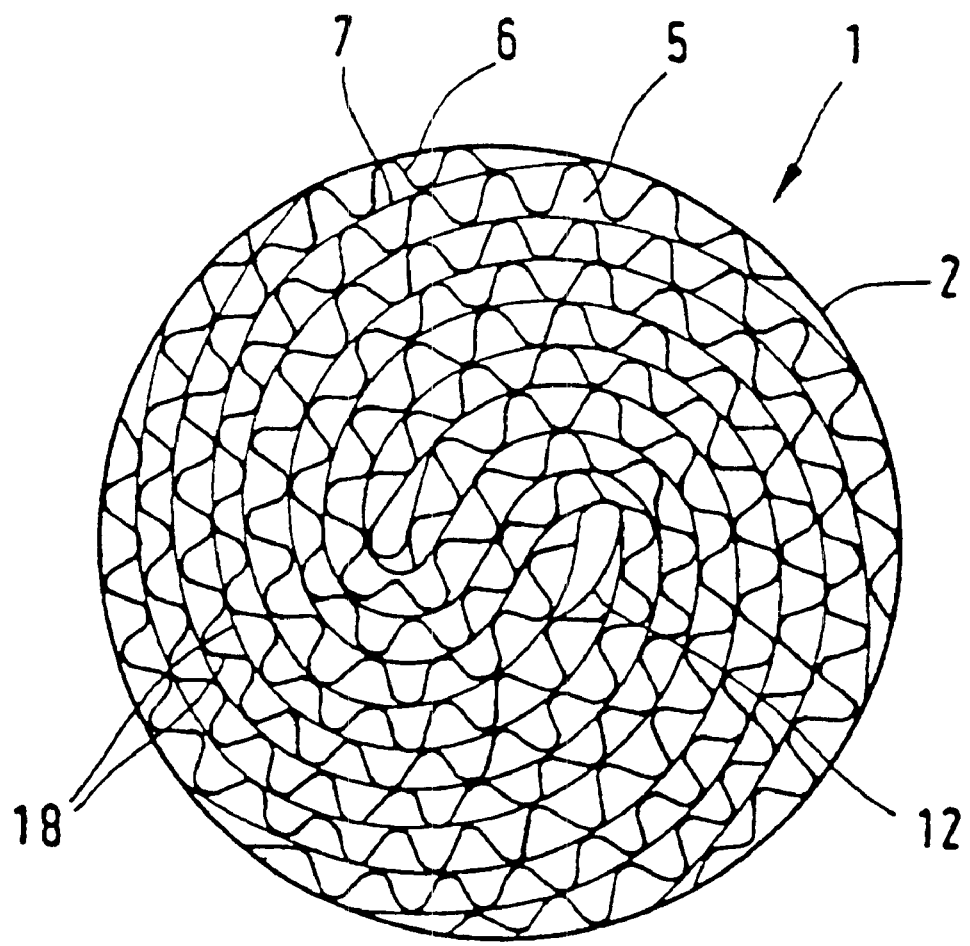
FIG. 1 is a diagrammatic, sectional view of a honeycomb structure known per se for a matrix body of a deformation element according to the invention in an undeformed state.

Referring now to the figures of the drawings in detail and first, particularly, to FIG. 1 thereof, there is shown a cross sectional view of a honeycomb matrix body 1. The honeycomb matrix body 1 is made up of alternating layers 6 of corrugated sheet metal and essentially smooth layers 7 of sheet metal with two spiral arms 12 wound together. The smooth layers 7 of sheet metal essentially rest on the corrugations of the corrugated layers 6 of sheet metal, thus forming a multiplicity of channels 5 within the matrix body. These channels 5 are separated from one another by walls 18 formed by the layers 6, 7 of sheet metal. The matrix body 1 is surrounded by a jacketing configuration 2. As a result, the deformation element is of very compact construction. A deformation element of this kind is provided in a supporting structure 4 (see FIGS. 2, 3, 4) in such a way that the kinetic energy, that can be absorbed through the use of the deformation element, is introduced essentially at an angle to the longitudinal axis 13 of the deformation element.

Figure 2:
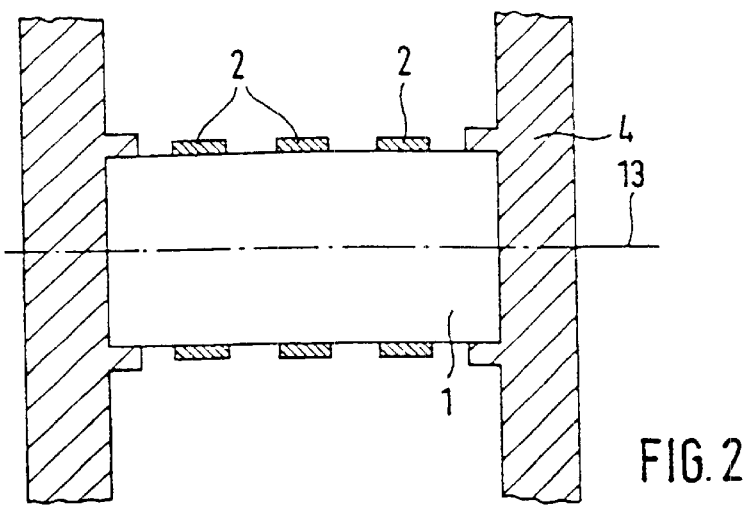
FIG. 2 is a diagrammatic, partial sectional view of a matrix body in a supporting structure with radial deformation limiters in accordance with a first embodiment of the invention.
Figure 3:
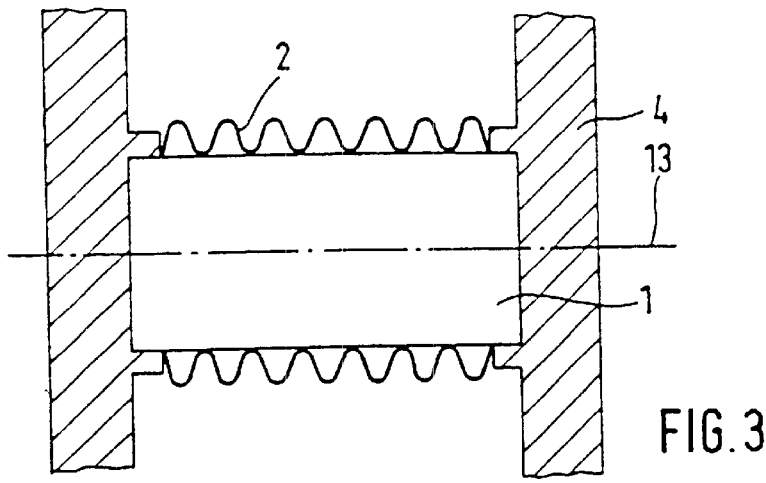
FIG. 3 is a diagrammatic, partial sectional view of a matrix body in the supporting structure with radial deformation limiters in accordance with a second embodiment of the invention.
Figure 4:
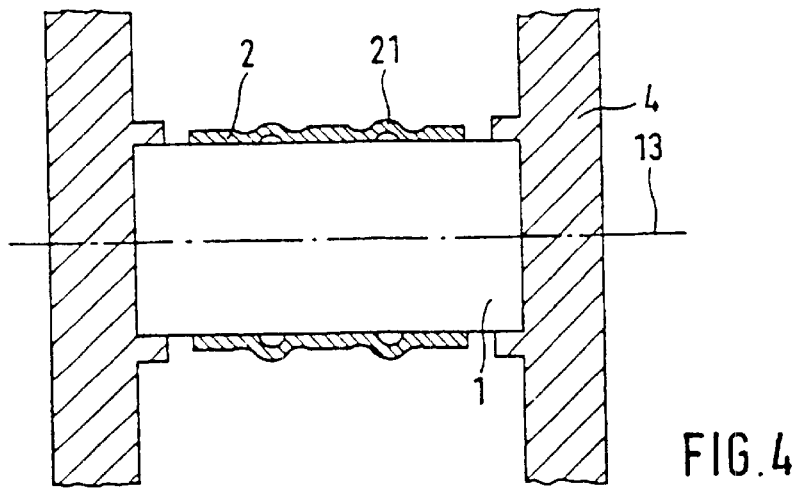
FIG. 4 is a diagrammatic, partial sectional view of a matrix body in the supporting structure with radial deformation limiters in accordance with a third embodiment of the invention.

FIGS. 2 to 4 show three exemplary embodiments of radial deformation limiters 2 surrounding the matrix body 1. As regards its longitudinal axis 13, the matrix body 1 of the deformation element is provided essentially perpendicular to the support on the supporting structure 4. According to FIG. 2, the matrix body 1 is surrounded by three encircling rings, which perform the function of radial deformation limiters. In this configuration, the width of the rings is dimensioned in such a way that the sum of the widths of all the rings is less than the residual block length of the matrix body 1 after complete compression. The radial deformation limiters 2 have a strength such that, during deformation, they essentially prevent that parts of the matrix body 1 yield into a direction other than the longitudinal axis 13 along which the deformation essentially occurs. Owing to the fact that the total width of the three deformation limiters is less than the residual block length of the matrix body 1, these radial deformation limiters 2 have at most an insignificant effect on the F,s profile of the deformation element.

FIG. 3 shows another exemplary embodiment. In this exemplary embodiment, the radial deformation limiter 2 provided is configured as a jacketing configuration in the form of a bellows-type corrugated hose. This bellows-type corrugated hose has only a low rigidity in the axial direction, i.e. in the direction of the longitudinal axis 13, in which the actual deformation of the deformation element is supposed to take place. However, the corrugated hose is dimensioned in such a way that it has a relatively high strength in the radial direction, thus acting as a radial deformation limiter. Owing to the fact that the axial rigidity of the corrugated hose is low, the corrugated hose has at most an insignificant effect on the F,s profile of the matrix body 1 during its deformation.

FIG. 4 shows another exemplary embodiment of the invention. Here, the radial deformation limiter 2 is made up of individual rings (see FIG. 2), which are connected by bead-like corrugated connecting sections 21. The combination of individual annular radial deformation limiters with elements of the deformation limiter shown in FIG. 3, which is configured as a corrugated hose, makes use of the advantages of both embodiments. Here, the entire axial length of the radial deformation limiter 2 is dimensioned in such a way that, when the matrix body 1 is compressed in absorbing kinetic energy, the radial deformation limiter 2 configured as a jacketing configuration is deformed in such a way, particularly at the connecting sections 21, that the $F_s$ profile of the matrix body 1 is not significantly affected. The axial rigidity of the deformation limiter 2 is likewise low, with the result that, in this exemplary embodiment too, the matrix body 1 represents a self-supporting deformation element.

Figure 5:
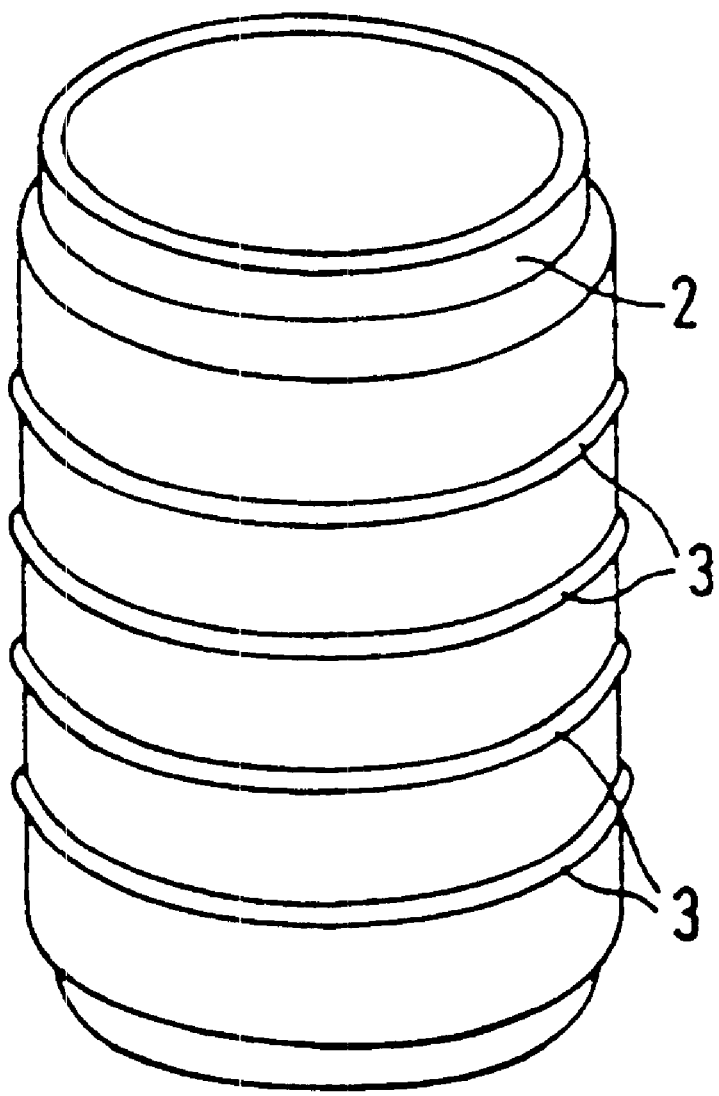
FIG. 5 is a diagrammatic perspective view of a radial deformation limiter in the form of a jacketing tube for accommodating a cylindrical honeycomb matrix body.

FIG. 5 represents schematically a radial deformation limiter 2 in the form of a jacketing tube for a deformation element. On its outer circumference, this deformation element has encircling beads 3. The radial deformation limiter is dimensioned in such a way that the deformation properties of this deformation element are not significantly affected as regards the $F_s$ profile. It is furthermore possible for each of the beads 3 to extend over only part of the circumference of the jacketing tube or for these beads to run around at least some sections of the outer circumference of the jacketing tube in a spiral.

FIG. 6 shows a deformation element according to the invention for use in a supporting structure 4 in accordance with the invention. The deformation element is illustrated in section, and, for the sake of simplicity, the section through the matrix body 1, which is known per se, is taken without showing the individual channels 5 or cavities of the matrix body 1. The matrix body 1 is self-supporting and represents the actual deformation element. The deformation element shown is installed in the supporting structure 4 in such a way that the kinetic energy is introduced from the left. As kinetic energy is introduced, the deformation element absorbs the kinetic energy and converts it into corresponding deformation energy, resulting in a defined deformation. The ends of the deformation element are covered by respective supporting plates. The opposite end 19 of the deformation element, at which end the kinetic energy is introduced, is in the form of a perforated plate 9, which has a hole 10 in the central area. The hole 10, which is defined by an edge 20, is large enough to ensure that, before the deformation element reaches its residual block length, the deformation element can be deformed further by the compression and shear forces associated with the introduction of correspondingly high kinetic energies, thus making it possible to achieve an even shorter residual block length.

According to FIG. 7, this is achieved by virtue of the fact that, if the kinetic energy introduced is sufficiently large, material from the matrix body in the area of the hole 10 in the perforated plate 9 can push through the hole 10 along the deformation path and hence out of the actual deformation element before the residual block length is reached. This causes an at least partially sheared-off portion 11 of material, which ensures that the residual block length of such a deformation element can be further reduced for given dimensions of construction. This makes it possible to absorb higher deformation energies without the risk of damaging the supporting structure 4 on which the deformation element is supported.

From FIGS. 1 to 7, it can be seen that the $F_s$ profile of the deformation element according to the invention can be selectively influenced for the respective application by way of the configuration of the radial deformation limiters (individual rings, wall thickness, with or without jacket beads), matrix body configuration (cell density, thickness of the layer of sheet metal) and the matrix body (standard material, standard with transverse structures (TS standard), or roll-bonded or roll-plated strip).

FIG. 8 shows the fundamental configuration of a deformation element held by a supporting structure 4. Here, the deformation element is supported at one end by the supporting structure 4. The kinetic energy is introduced in the direction of the longitudinal axis 13 at the opposite end of the deformation element from the support 14, this kinetic energy being represented by m $\times c^2/2$. The task of the deformation element is to convert the kinetic energy introduced into deformation, and, for the design load on the deformation element, this deformation should be performed exclusively by the deformation element itself without deformation of or damage to the supporting structure 4. A deformation element dimensioned in this way thus forms a replaceable component, which is supported in such a way in the supporting structure 4, that it can be removed easily and replaced by a new one. This is especially important in the case of motor vehicles if a deformation element of this kind is used for a bumper system.

FIG. 9 shows another exemplary embodiment of the fundamental structure of a matrix body for a deformation element. The honeycomb matrix body has a construction such that structured layers 6 of sheet metal provided with a corrugation are wound alternately in a spiral with essentially smooth layers 7 of sheet metal to give an essentially cylindrical form. By virtue of the corrugations, the honeycomb matrix body 1 has channels 5, which extend in the direction of the longitudinal axis 13 indicated by the arrow. Moreover, both the corrugated layers 6 of sheet metal and the essentially smooth layers 7 of sheet metal of the matrix body 1 additionally have microstructures 8 extending essentially transversely to the longitudinal extent of the channels 5. These microstructures 8 represent predetermined deformation points for the deformation process during the action of a corresponding kinetic energy and through the use of these points it is possible to dissipate an excessive initial peak 15 (see FIG. 12), reflected in the $F_s$ profile, that would otherwise occur, especially at the beginning of the deformation process.

Figure 10:
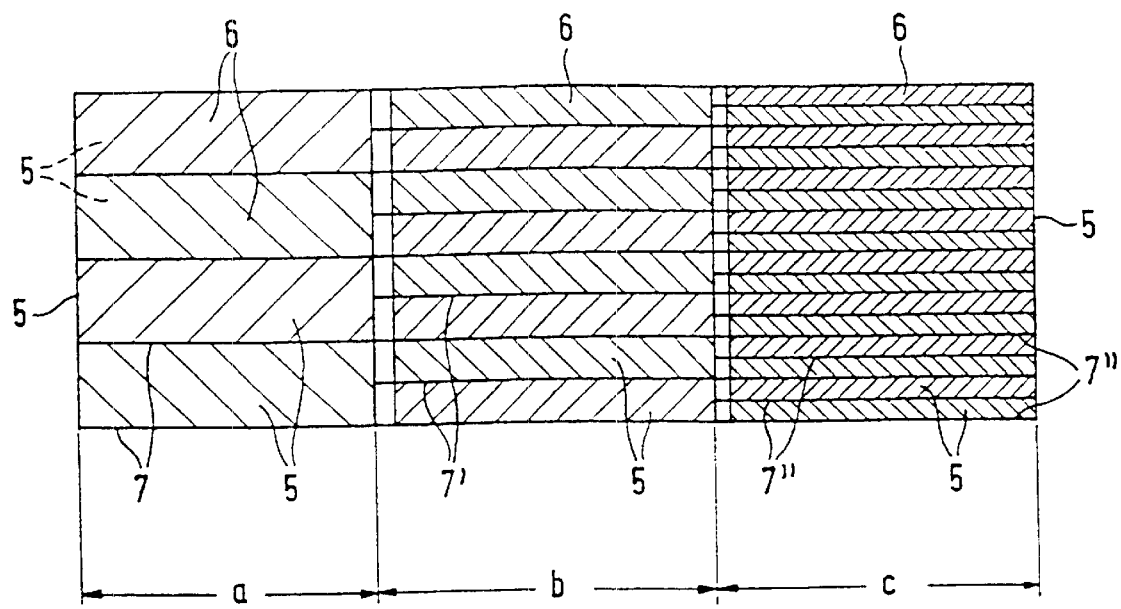
FIG. 10 is a diagrammatic sectional view of a honeycomb matrix body along the direction of the channels of the honeycomb matrix body, different cell densities being implemented in the direction of the channels.

FIG. 10 shows another exemplary embodiment. In this exemplary embodiment, the deformation element has three zones "a", "b", "c", in which different cell densities are implemented. The illustration in FIG. 10 is a section in the direction of the channels 5. Smooth layers 7 of sheet metal extend over the length of the deformation element a+b+c in the direction of the channels 5. Provided in section "a", between smooth layers 7 of sheet metal, there is in each case a structured layer 6 of sheet metal with a corrugation amplitude corresponding to the distance between the smooth layers 7 of sheet metal measured in the radial direction. Provided in section "b" and "c" there are in addition smooth layers 7' of sheet metal between the layers 7 of sheet metal, corrugated layers 6 of sheet metal being provided between the smooth layers 7 and 7' of sheet metal in section "b", these layers 6 having a corrugation amplitude corresponding to the distance between the layers 7 and 7' of sheet metal. Provided in section "c", between the smooth layers 7 and 7' of sheet metal, there are in addition smooth layers 7" of sheet metal, with the result that the smooth layers 7, 7' and 7" of sheet metal have provided between them corrugated layers 6 of sheet metal, the corrugation amplitude of which corresponds to the distance between the smooth layers 7 and 7" and 7" and 7'. This results in a deformation element constructed with a varying cell density in the longitudinal direction of the channels 5. The advantage of such a deformation element with a varying cell density is that the F,s profile can be selectively influenced section by section in individual areas of the deformation element. This in turn increases the versatility of the deformation element according to the invention in terms of its applications.

Figure 11:
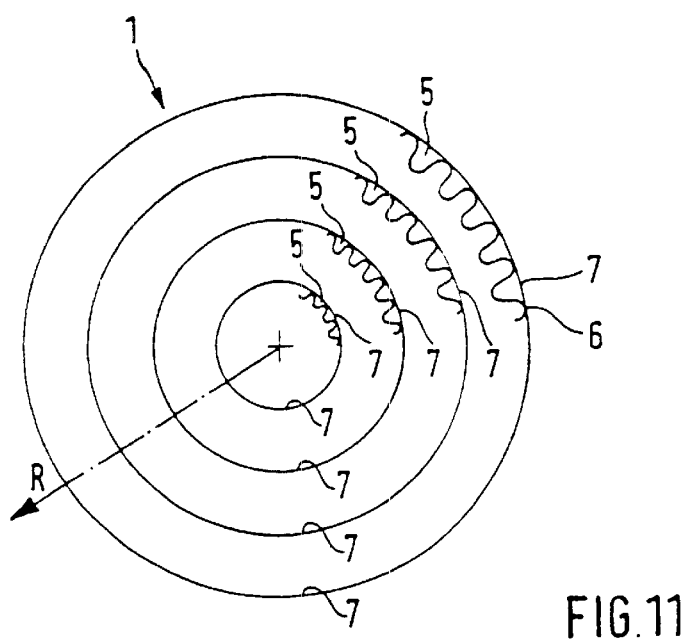
FIG. 11 is a schematic view of a deformation element in accordance with another exemplary embodiment of the invention with a matrix body having cell densities that vary in the radial direction.

FIG. 11 shows another exemplary embodiment of a deformation element, in which the honeycomb matrix body 1 is constructed from essentially concentric, alternately provided smooth layers 7 and structured layers 6 of sheet metal, the corrugation amplitude of the structured layers 6 of sheet metal increasing from the inside outwards in the direction of the radius R. To simplify the illustration, only a part of the smooth layer of sheet metal and the structured layers 6 of sheet metal provided with corrugations has been illustrated. The channels 5 are formed by the corrugations of the structured layers 6 of sheet metal. To obtain a cell density that increases from the inside of a cylindrical matrix structure 1 outwards, it is also possible for the matrix body 1 to be wound in a spiral from a smooth layer 7 of sheet metal and a structured layer of sheet metal provided thereon with a corrugation amplitude that increases in one direction. This gives a continuous increase in the cell density of a honeycomb matrix body 1 of this kind from the inside outwards in the direction of the radius R.

Figure 12:
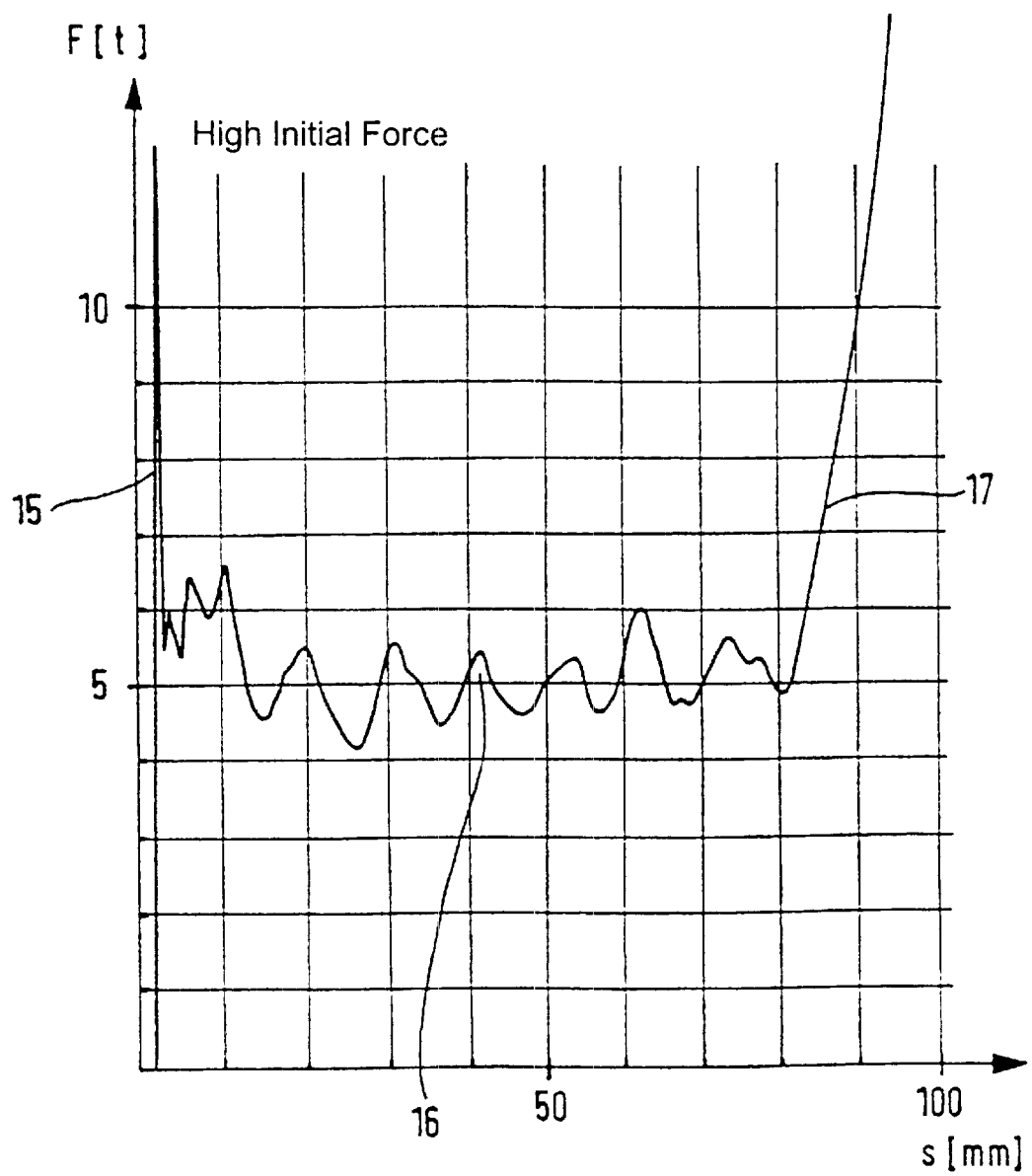
FIG. 12 is a deformation force/deformation path profile (F,s profile) for a first exemplary embodiment of the invention.
Figure 13:
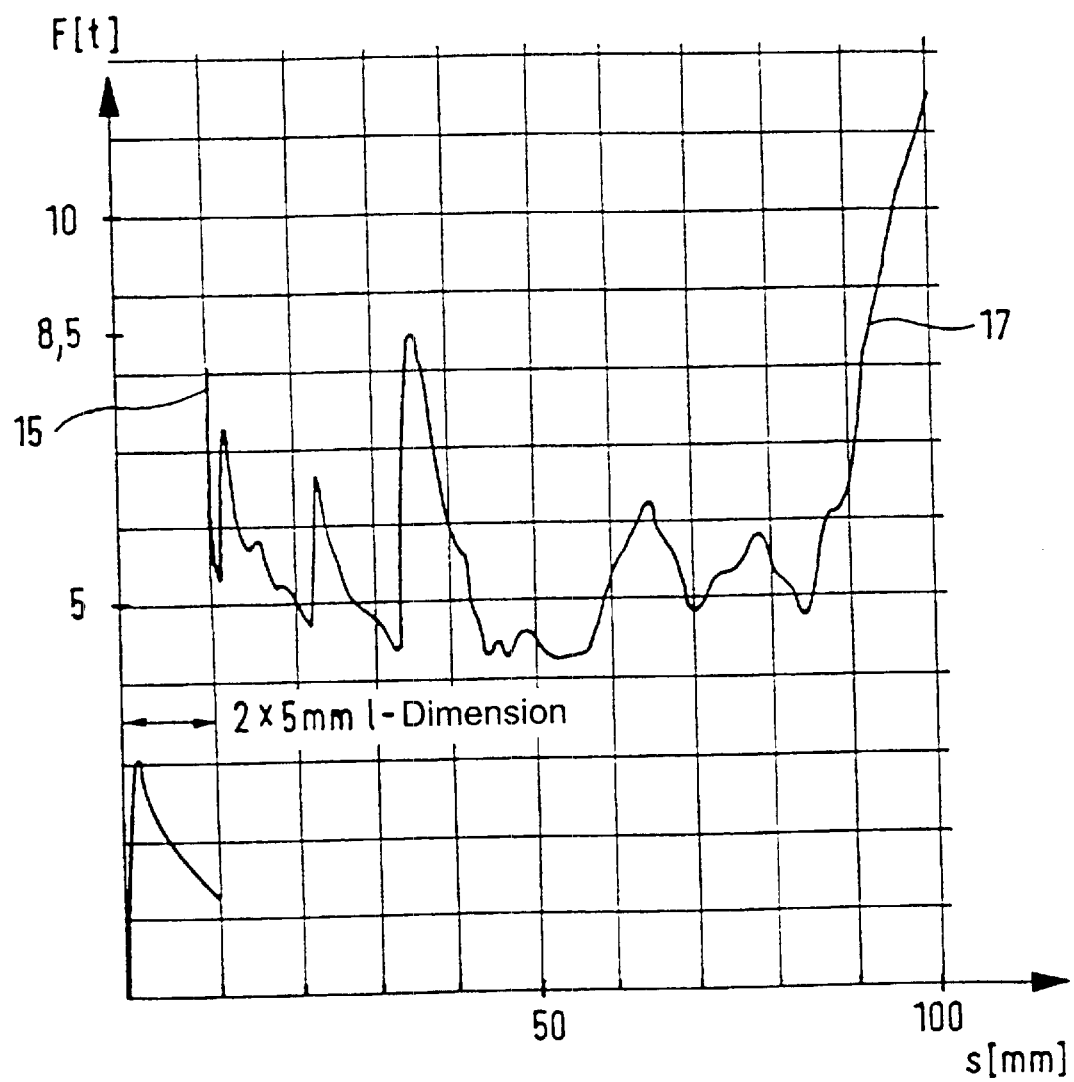
FIG. 13 is an F,s profile for a second exemplary embodiment in accordance with the invention.

FIGS. 12 and 13 each show an F,s profile by way of example. These F,s profiles were determined in tests with the matrix body material including steel (standard material) containing chromium and aluminum. The matrix body configurations studied had 160 cpsi (24.8 cells/cm$^2$), 100 cpsi (15.5 cells/cm$^2$) and 0 cpsi (only compression of a jacket including roll-bonded or roll-plated steel). The jacketing configurations studied were a jacket without beads, a jacket with three beads and a jacket with eight beads. The jacketing wall thicknesses employed were 0.5 mm and 0.8 mm. The deformation element studied was cylindrical. The jacketing configuration 2 had an overlap relative to the actual honeycomb matrix body 1 of 5 mm at each end. A perforated plate was not provided.

FIG. 12 shows a test outcome by way of example, where a high initial force of about 130 kN occurs in the deformation element at the beginning, as a peak force, when a corresponding kinetic energy begins to be introduced, before the actual deformation takes place at forces of between 40 and 65 kN. In the case of the F,s profile shown, the central area 16 that follows the initial peak 15 is essentially constant, i.e. in the central area 16 the force fluctuates only slightly around a mean value of about 50 kN. When the final deformation state (residual block length) is reached, this being about 85 mm in the case of the deformation element studied, the final rise 17 occurs. This means that there is almost no more deformation if the compressive load on the deformation element is increased further.

If additional beads are introduced into the radial deformation limiter 2, as illustrated in FIG. 5, the beads 3 are deformed first. This means that the matrix body 1 initially slides in the jacketing configuration until the respective sides of the beads 3 have been folded up against one another under a force of about 25 to 10 kN (see FIG. 13). Only then, as shown in FIG. 13, is there a jump, representing the actual initial peak 15, to about 85 kN. The initial peak 15, i.e. the initial force, can be lowered by reducing the thickness of the jacketing material from 0.8 mm to 0.5 mm. Owing to the thinner material, the remaining residual height of a flattened deformation element of this kind is somewhat less than in the case of a material with a thickness of 0.8 mm. This means that the maximum deformation travel is greater.

The height of the initial peak 15 can likewise be reduced somewhat if the thickness of the jacketing configuration is 0.8 mm and three beads are provided. It was not possible to reduce the initial peak 15 further by providing eight beads in a jacketing configuration with a thickness of 0.8 mm.

If the jacketing configuration is provided with an overlap of 5 mm at each end of the matrix body 1, this overhang acts as a preliminary deformation stage. Once this deformation stage has been "used up" during the deformation process, the jacketing configuration forms a radial deformation limiter which, given an appropriate number of beads, does not significantly affect the F,s profile.

While the F,s profile shown in FIG. 13 was recorded for a matrix body 1 with 100 cpsi (15.5 cells/cm$^2$), the F,s profile shown in FIG. 12 corresponds to a matrix body 1 with 160 cpsi (24.8 cells/cm$^2$). From a comparison between the two F,s profiles, it can be seen that, with increasing cell density, the mean deformation force in the central area 16 of the F,s profile is not only reduced but can also been made significantly more uniform. A uniform central area 16 in the F,s profile has the advantage that the kinetic energy can be absorbed uniformly by the deformation element, thus reducing the loads on the supporting structure 4 supporting the deformation element and hence the risk that this supporting structure 4 will be damaged.

It is likewise possible to reduce the mean deformation force in the central area 16 of the F,s profile compared with standard material by using a material with transversely structured corrugation for the structured layer 6 of sheet metal. A further reduction can be achieved by using a roll-bonded or roll-plated strip instead of the transversely structured corrugation.

Figure 14:
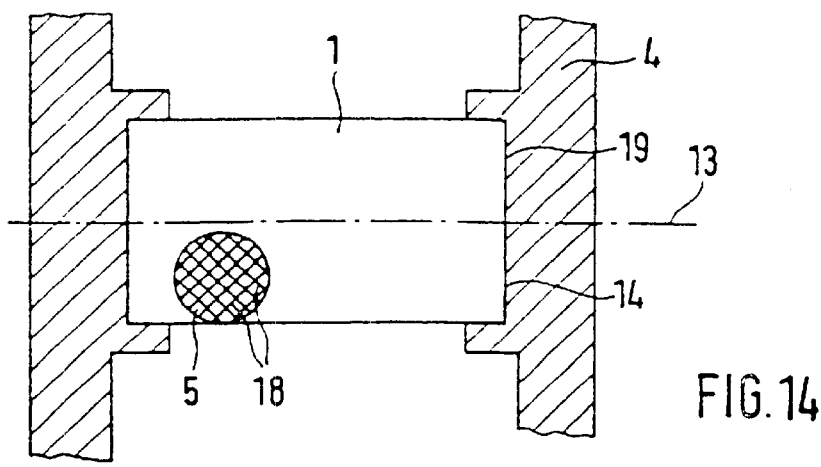
FIG. 14 is a diagrammatic, partial sectional view of a fundamental configuration of a deformation element on the supporting structure in accordance with a first embodiment of the invention.
Figure 15:
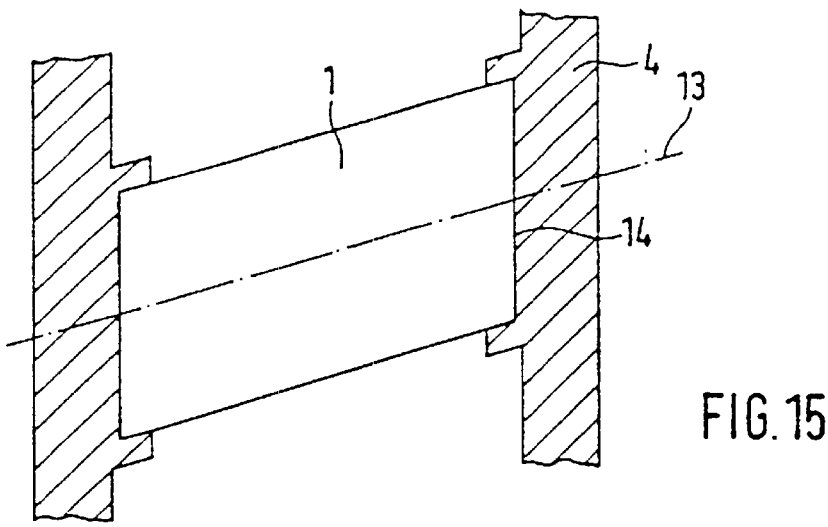
FIG. 15 is a diagrammatic, partial sectional view of a fundamental configuration of a deformation element on the supporting structure in accordance with a second embodiment of the invention.
Figure 16:
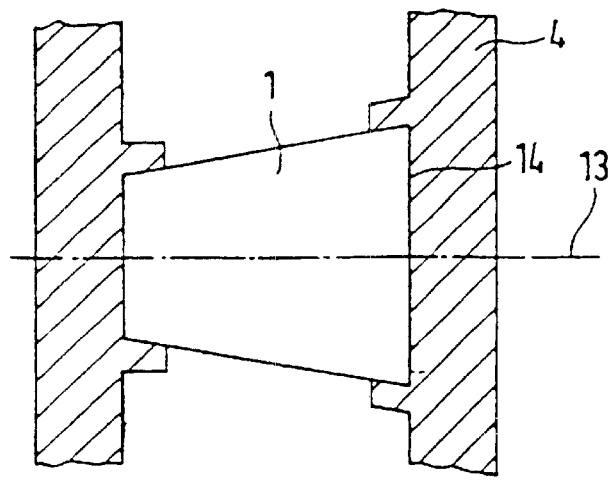
FIG. 16 is a diagrammatic, partial sectional view of a fundamental configuration of a deformation element on the supporting structure in accordance with a third embodiment of the invention.
Figure 17:
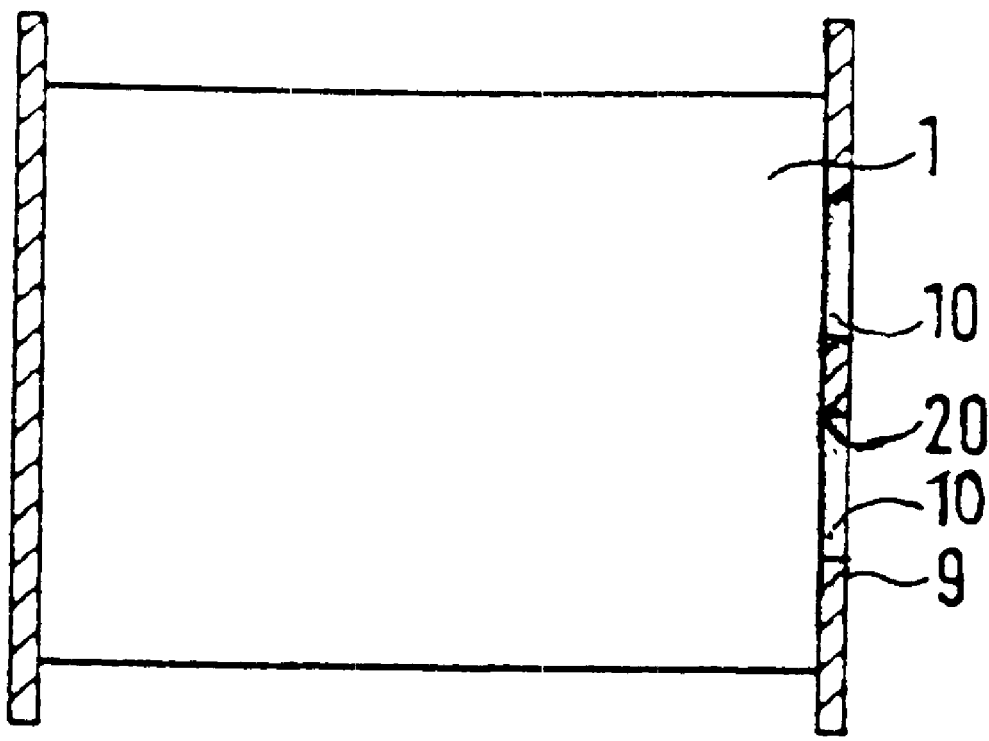
FIG. 17 is a diagrammatic sectional view of a deformation element in accordance with the invention with a simplified illustration of the matrix body showing multiple holes in the end plate.

FIGS. 14 to 16 show three exemplary embodiments of the configuration of the matrix body 1 relative to the supporting structure 4. As regards its longitudinal axis 13, the matrix body 1 of the deformation element is provided essentially perpendicular to the support 14 on the supporting structure 4. The end 19 of the matrix body 1 rests against a corresponding surface on the supporting structure 4. It is also possible that the surface has holes or recesses. Here, the matrix body 1 is constructed from obliquely laid, wound or looped structured layers of sheet metal, the layers of sheet metal either being wound, looped or laid obliquely relative to one another or smooth layers 7 of sheet metal being provided between the structured layers 6 of sheet metal laid obliquely relative to one another. In FIG. 14, this is shown by way of illustration in the circle, which shows a simplified developed plan view of the layers of sheet metal laid crosswise one above the other. Arranging layers of sheet metal in this way gives crossed channels 5 bounded by walls that form an angle to the longitudinal axis 13 of the matrix body 1. Owing to this oblique configuration of the walls 18, forces are introduced at an angle to the main direction of extension of the walls 18.

According to another exemplary embodiment of the invention, which is illustrated in FIG. 15, the matrix body 1 is constructed in such a way that its longitudinal axis 13 is at an angle to the support 14 on the supporting structure 4. A matrix body 1 provided in this way can be wound, looped or packed in a manner known per se so that the channels formed by the walls extend essentially coaxially to the longitudinal axis 13. However, it is also possible, in the case of a configuration in accordance with the exemplary embodiment shown in FIG. 15, for the individual layers of sheet metal to be provided with their structures crosswise or at an angle relative to the longitudinal axis 13. In these two cases too, forces are introduced at an angle to the main direction of extension of the walls 18.

According to another exemplary embodiment of the invention, which is illustrated in FIG. 16, the matrix body 1 is configured as a frustoconical matrix body. In the case of a matrix body 1 constructed in this way, the longitudinal axis 13 is provided essentially perpendicular to the support 14 on the supporting structure 4. Outside the area immediately surrounding the longitudinal axis 13, the main direction of extension of the walls is at an angle to the forces introduced in the direction of the longitudinal axis 13 in the event of an impact. As a result, at least some of the forces developed during an impact are introduced at an angle into the respective walls in the case of such a frustoconical matrix body 1.

During the introduction of kinetic energy, the walls of the respective layer of sheet metal which delimit the channels can deform into the corresponding channel spaces, with the result that, theoretically, a deformation element of this kind can continue to absorb kinetic energy for as long as there are cavities in the matrix body 1. During this process, the kinetic energy is absorbed both by the honeycomb matrix body 1. The jacketing configuration is configured in such a way that it does not serve to any significant extent, if at all, to absorb kinetic energy but is merely configured as a radial deformation limiter. Once the amount of kinetic energy absorbed is such that those parts of the respective layers of sheet metal that form the walls have been deformed completely into the free spaces present in the channels, the deformation element reaches its final compression length, which is referred to as the residual block length. Once the residual block length of the deformation element has been reached, further compression beyond this residual block length is only possible through an extreme rise in the forces required for further compression. For purposes of practical application, this means that, once this state, which essentially represents the final deformation state of the deformation element, has been reached, there is virtually no further deformation capacity, even if there is a sharp rise in the forces introduced. This can result in damage to the supporting structure on which the deformation element is supported. This final rise 17 is illustrated in FIG. 12.

We claim:

1. A support assembly for a motor vehicle, comprising:
   a supporting structure;
   a deformation element for absorbing kinetic energy during an impact, said deformation element being connected to said supporting structure and being deformable as far as a residual length, and said deformation element including a honeycomb matrix body;
   said honeycomb matrix body being a self-supporting configuration and having at least two axial partial regions spaced from one another;
   said honeycomb matrix body including at least one radial deformation limiter disposed in said at least two axial partial regions of said matrix body; and
   said honeycomb matrix body having a first axial rigidity and said at least one radial deformation limiter having a second axial rigidity smaller than the first axial rigidity.

2. The support assembly according to claim 1, wherein said at least one radial deformation limiter is a jacket, said jacket at least partially surrounds said honeycomb matrix body.

3. The support assembly according to claim 1, wherein said second axial rigidity and said first axial rigidity have a ratio of between 1:5 and 1:50.

4. The support assembly according to claim 1, wherein said second axial rigidity and said first axial rigidity have a ratio of less than 1:10.

5. The support assembly according to claim 1, wherein:
   said at least one radial deformation limiter is a plurality of jacketing rings; and
   said jacketing rings are spaced apart from one another and are disposed around said honeycomb matrix body.

6. The support assembly according to claim 1, wherein:
   said at least one radial deformation limiter is a bellows-shaped corrugated hose with corrugation troughs, said bellows-shaped corrugated hose has predetermined buckling points and has an inside diameter;
   said honeycomb matrix body has a circumferential surface; and said inside diameter of said bellows-shaped corrugated hose is dimensioned such that said corrugation troughs substantially touch said circumferential surface of said honeycomb matrix body.

7. The support assembly according to claim 6, wherein:
   said bellows-shaped corrugated hose has corrugations; and
   said corrugations are initiating structures for initiating at least one of buckles and folds in said at least one radial deformation limiter at a beginning of a deformation.

8. The support assembly according to claim 1, wherein:
   said at least one radial deformation limiter has a first residual block length; and
   said deformation element is deformable such that said honeycomb matrix body has a second residual block length greater than said first residual block length.

9. The support assembly according to claim 1, wherein:
   said deformation element has a front side and a perforated plate disposed at least at said front side;
   said supporting structure has a support region provided at said front side;
   said perforated plate is formed with at least one hole; and
   said honeycomb matrix body has portions disposed at said at least one hole, said at least one hole is dimensioned such that said portions of said honeycomb matrix body are displaceable in a deformation direction.

10. The support assembly according to claim 9, wherein:
    said honeycomb matrix body includes a plurality of sheet metal layers;
    said at least one hole is a plurality of uniformly distributed holes each defining a respective edge in said perforated plate; and
    said respective edge extends over several of said sheet metal layers.

11. The support assembly according to claim 9, wherein:
    said honeycomb matrix body includes a plurality of sheet metal layers;
    said at least one hole is a plurality of uniformly distributed holes each defining a respective edge in said perforated plate; and
    said respective edge extends over at least five of said sheet metal layers.

12. The support assembly according to claim 9, wherein:
    said honeycomb matrix body includes a plurality of sheet metal layers;
    said at least one hole is a plurality of uniformly distributed holes each defining a respective edge in said perforated plate; and
    said respective edge extends over at least ten of said sheet metal layers.

13. The support assembly according to claim 9, wherein:
said perforated plate has an outer area; and
said at least one hole is disposed in said outer area of said perforated plate.

14. The support assembly according to claim 10, wherein:
said perforated plate has an outer area; and
said plurality of holes are disposed in said outer area of said perforated plate.

15. The support assembly according to claim 9, wherein:
said perforated plate has a total area; and
said at least one hole covers 20 to 80% of said total area.

16. The support assembly according to claim 9, wherein:
said perforated plate has a total area; and
said at least one hole covers 40 to 60% of said total area.

17. The support assembly according to claim 9, wherein:
said at least one hole defines an edge in said perforated plate; and
said perforated plate with said edge is integrated into said support region of said supporting structure.

18. The support assembly according to claim 6, wherein said predetermined buckling points are substantially configured as encircling beads.

19. The support assembly according to claim 2, wherein said jacket has a thickness of 0.3 mm to 2.0 mm.

20. The support assembly according to claim 2, wherein said jacket is an aluminum jacket with a thickness of 0.5 mm to 2.0 mm.

21. The support assembly according to claim 2, wherein said jacket is a steel jacket with a thickness of 0.3 mm to 1.5 mm.

22. The support assembly according to claim 2, wherein said jacket is a deep-drawn steel jacket.

23. The support assembly according to claim 1, wherein:
said honeycomb matrix body includes sheet metal layers;
said sheet metal layers have a layer thickness of 0.02 mm to 0.2 mm; and
said honeycomb matrix body has a cell density of 7.75 to 93 cells/cm$^2$.

24. The support assembly according to claim 23, wherein said sheet metal layers include at least partially corrugated sheet metal layers forming a plurality of channels.

25. The support assembly according to claim 23, wherein said sheet metal layers are aluminum layers having a thickness of 0.05 to 0.2 mm.

26. The support assembly according to claim 23, wherein said sheet metal layers are steel layers having a thickness of 0.02 to 0.15 mm.

27. The support assembly according to claim 23, wherein said sheet metal layers are deep-drawn steel layers.

28. The support assembly according to claim 23, wherein said sheet metal layers are stacked sheet metal layers including at least partially structured sheet metal layers.

29. The support assembly according to claim 23, wherein said sheet metal layers are one of spirally wound layers and spirally looped layers forming a substantially cylindrical assembly.

30. The support assembly according to claim 29, wherein said one of spirally wound layers and spirally looped layers are one of involute-shaped layers and S-shaped layers.

31. The support assembly according to claim 23, wherein:
said sheet metal layers form a plurality of channels extending along a given direction;
said honeycomb matrix body has sections along the given direction; and
said cell density of said honeycomb matrix body varies in dependence of said sections.

32. The support assembly according to claim 23, wherein:
said sheet metal layers form a plurality of channels extending along a given direction; and
said sheet metal layers have bead-shaped structures extending at a given angle with respect to the given the direction.

33. The support assembly according to claim 32, wherein said bead-shaped structures extend transversely with respect to the given direction.

34. The support assembly according to claim 32, wherein said bead-shaped structures are spaced from one another by a distance of 2 mm to 20 mm.

35. The support assembly according to claim 23, wherein said sheet metal layers form a plurality of channels and have laterally offset channel sections.

36. The support assembly according to claim 23, wherein at least some of said sheet metal layers have corrugations forming one of a curved configuration and a herringbone configuration.

37. The support assembly according to claim 1, including a foamed material filling said honeycomb matrix body.

38. The support assembly according to claim 37, wherein said foamed material is a foamed plastic.

39. The support assembly according to claim 37, wherein said foamed material is a corrosion-inhibiting foamed plastic.

40. The support assembly according to claim 1, wherein:
said honeycomb matrix body has walls having a main direction of extension, said walls define cavities in said honeycomb matrix body; and
said deformation element is secured to said supporting structure such that said walls are loadable, at an angle to the main direction of extension, with at least a part of impact forces generated during the impact.

41. The support assembly according to claim 40, wherein:
said deformation element has a longitudinal axis;
said honeycomb matrix body includes at least one at least partially structured sheet metal layer;
said at least one at least partially structured sheet metal layer forms a structure with walls having a main direction of extension extending at an angle with respect to the longitudinal axis; and
said structure is selected from the group consisting of a looped structure, a wound structure and a stacked structure.

42. The support assembly according to claim 40, wherein:
said deformation element has a front side;
said supporting structure has a support region provided at said front side; and
said deformation element has a longitudinal axis extending substantially perpendicular to said support region.

43. The support assembly according to claim 40, wherein:
said deformation element has a front side;
said supporting structure has a support region provided at said front side; and
said honeycomb matrix body has a longitudinal axis extending at an angle other than 90° with respect to said support region.

44. The support assembly according to claim 41, wherein said honeycomb matrix body is one of a conical matrix body and a frustoconical matrix body.

45. The support assembly according to claim 1, wherein said deformation element has a deformation force/deformation path profile with an insubstantial initial peak.

46. The support assembly according to claim 1, wherein said deformation element has predetermined deformation points and a deformation force/deformation path profile with at least one profile section being substantially constant due to said predetermined deformation points.

47. The support assembly according to claim 1, wherein said deformation element has predetermined deformation points and a deformation force/deformation path profile with at least one profile section progressively rising due to said predetermined deformation points.

48. The support assembly according to claim 1, wherein said deformation element has a maximum deformation path of 60 mm to 200 mm.

49. In combination with a motor vehicle, a bumper system, comprising:

a supporting structure;

a deformation element for absorbing kinetic energy during an impact, said deformation element being connected to said supporting structure and being deformable as far as a residual length, and said deformation element including a honeycomb matrix body;

said honeycomb matrix body being a self-supporting configuration and having at least two axial partial regions spaced from one another;

said honeycomb matrix body including at least one radial deformation limiter disposed in said at least two axial partial regions of said honeycomb matrix body; and said honeycomb matrix body having a first axial rigidity and said at least one radial deformation limiter having a second axial rigidity smaller than the first axial rigidity.

* * * * *